US012686805B2

(12) United States Patent (10) Patent No.: US 12,686,805 B2
Patil et al. (45) **Date of Patent: \*Jul. 21, 2026**

(54) THIXOTROPIC SLURRY WITH ENHANCED RELIABILITY FOR USE IN A WELLBORE

(71) Applicant: Halliburton Energy Services, Inc., Houston, TX (US)

(72) Inventors: Sandip Prabhakar Patil, Pune (IN); Malharrao Hambirrao Jadhav, Pune (IN); Ganesh Shriniwas Pangu, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/784,408

(22) Filed: Jul. 25, 2024

(65) Prior Publication Data

US 2024/0376368 A1 Nov. 14, 2024

Related U.S. Application Data

(63) Continuation of application No. 18/081,026, filed on Dec. 14, 2022, now Pat. No. 12,077,710.

(51) Int. Cl.
| | |
|---|---|
| *C09K 8/467* | (2006.01) |
| *C04B 14/06* | (2006.01) |
| *C04B 14/10* | (2006.01) |
| *C04B 24/28* | (2006.01) |
| *C04B 28/32* | (2006.01) |
| *C09K 8/508* | (2006.01) |

(Continued)

(52) U.S. Cl.
CPC .............. *C09K 8/467* (2013.01); *C04B 14/06* (2013.01); *C04B 14/10* (2013.01); *C04B 24/281* (2013.01); *C04B 28/32* (2013.01);

*C09K 8/5086* (2013.01); *E21B 21/003* (2013.01); *E21B 33/14* (2013.01); *C04B 2111/0012* (2013.01); *C04B 2201/20* (2013.01); *C04B 2201/50* (2013.01)

(58) Field of Classification Search
None
See application file for complete search history.

(56) References Cited

U.S. PATENT DOCUMENTS

| | | | |
|---|---|---|---|
| 8,685,903 B2 | 4/2014 | Ravi et al. | |
| 10,059,870 B2 | 8/2018 | Joseph et al. | |

(Continued)

FOREIGN PATENT DOCUMENTS

| | | |
|---|---|---|
| WO | 2011154693 A1 | 12/2011 |

OTHER PUBLICATIONS

U.S. Appl. No. 18/081,026, Final Office Action mailed Mar. 12, 2024, 15 pages.

(Continued)

*Primary Examiner* — Andrew Sue-Ako
(74) *Attorney, Agent, or Firm* — Kilpatrick Townsend & Stockton LLP

(57) ABSTRACT

A thixotropic slurry material can be used in a wellbore during a wellbore operation. The wellbore operation can include a drilling operation, a cementing operation, or any other suitable operation that may include injecting a liquid material into the wellbore. The thixotropic slurry material can be a mixture of a cement, a clay mineral, and a suspending agent and can be injected into a wellbore during the wellbore operation.

20 Claims, 3 Drawing Sheets

(51) Int. Cl.

| | |
|---|---|
| *E21B 21/00* | (2006.01) |
| *E21B 33/14* | (2006.01) |
| *C04B 111/00* | (2006.01) |

(56) References Cited

U.S. PATENT DOCUMENTS

| | | | |
|---|---|---|---|
| 12,077,710 B2 * | 9/2024 | Patil | C04B 24/281 |
| 2006/0122071 A1 | 6/2006 | Reddy et al. | |
| 2008/0060820 A1 | 3/2008 | Bour et al. | |
| 2014/0374097 A1 | 12/2014 | Morgan et al. | |
| 2015/0175481 A1 | 6/2015 | Pisklak et al. | |
| 2015/0292279 A1 | 10/2015 | Wang | |
| 2016/0318710 A1 | 11/2016 | Williams et al. | |
| 2017/0073567 A1 | 3/2017 | Reddy et al. | |
| 2017/0247598 A1 | 8/2017 | Kennedy et al. | |
| 2020/0071595 A1 | 3/2020 | Al-yami et al. | |
| 2020/0362222 A1 | 11/2020 | Jones et al. | |
| 2021/0189219 A1 | 6/2021 | Alanqari et al. | |
| 2021/0292231 A1 | 9/2021 | Alanqari et al. | |
| 2021/0355366 A1 * | 11/2021 | Jadhav | C09K 8/467 |
| 2021/0403793 A1 * | 12/2021 | Pindiprolu | C09K 8/5045 |

OTHER PUBLICATIONS

U.S. Appl. No. 18/081,026, Non-Final Office Action mailed Dec. 12, 2023, 14 pages.

U.S. Appl. No. 18/081,026, Notice of Allowance mailed Apr. 24, 2024, 9 pages.

International Patent Application No. PCT/US2022/053101, International Search Report and the Written Opinion mailed Sep. 8, 2023, 11 pages.

U.S. Appl. No. 18/784,387, Non-Final Office Action, mailed on Aug. 5, 2025, 17 pages.

* cited by examiner

THIXOTROPIC SLURRY WITH ENHANCED RELIABILITY FOR USE IN A WELLBORE

CROSS-REFERENCE TO RELATED APPLICATIONS

This application is a continuation of U.S. patent application Ser. No. 18/081,026, filed Dec. 14, 2022, and titled "THIXOTROPIC SLURRY WITH ENHANCED RELIABILITY FOR USE IN A WELLBORE," the entirety of which is incorporated herein by reference.

TECHNICAL FIELD

The present disclosure relates generally to wellbore operations. The present disclosure relates more particularly (although not necessarily exclusively) to materials that include a thixotropic slurry that can be used in wellbore operations.

BACKGROUND

During drilling operations, a drilling fluid can be used to cool the drilling bit, control pressure within the wellbore, and suspend and transport drill cuttings from the wellbore to the surface. The drilling fluid can be circulated downwardly through the interior of a drill pipe and the wall of the subterranean formation. Once a casing is in place, cement slurry may be positioned in the annulus to seal the annulus. During drilling and cementing, permeable zones in the subterranean formation may be encountered. The permeable zones may be, for example, vugs, voids, naturally occurring fractures, or induced fractures that occur when weak zones have fracture gradients exceeded by the hydrostatic pressure of the drilling fluid or the cement slurry. The permeable zones may result in the loss of the drilling fluid circulation in the wellbore during the drilling operation and can cause the drilling operation to be delayed. Plugging materials can be used to seal the permeable zones in the subterranean formation and to prevent the loss of circulation of drilling fluids during the wellbore creation.

DETAILED DESCRIPTION

Figure 1:
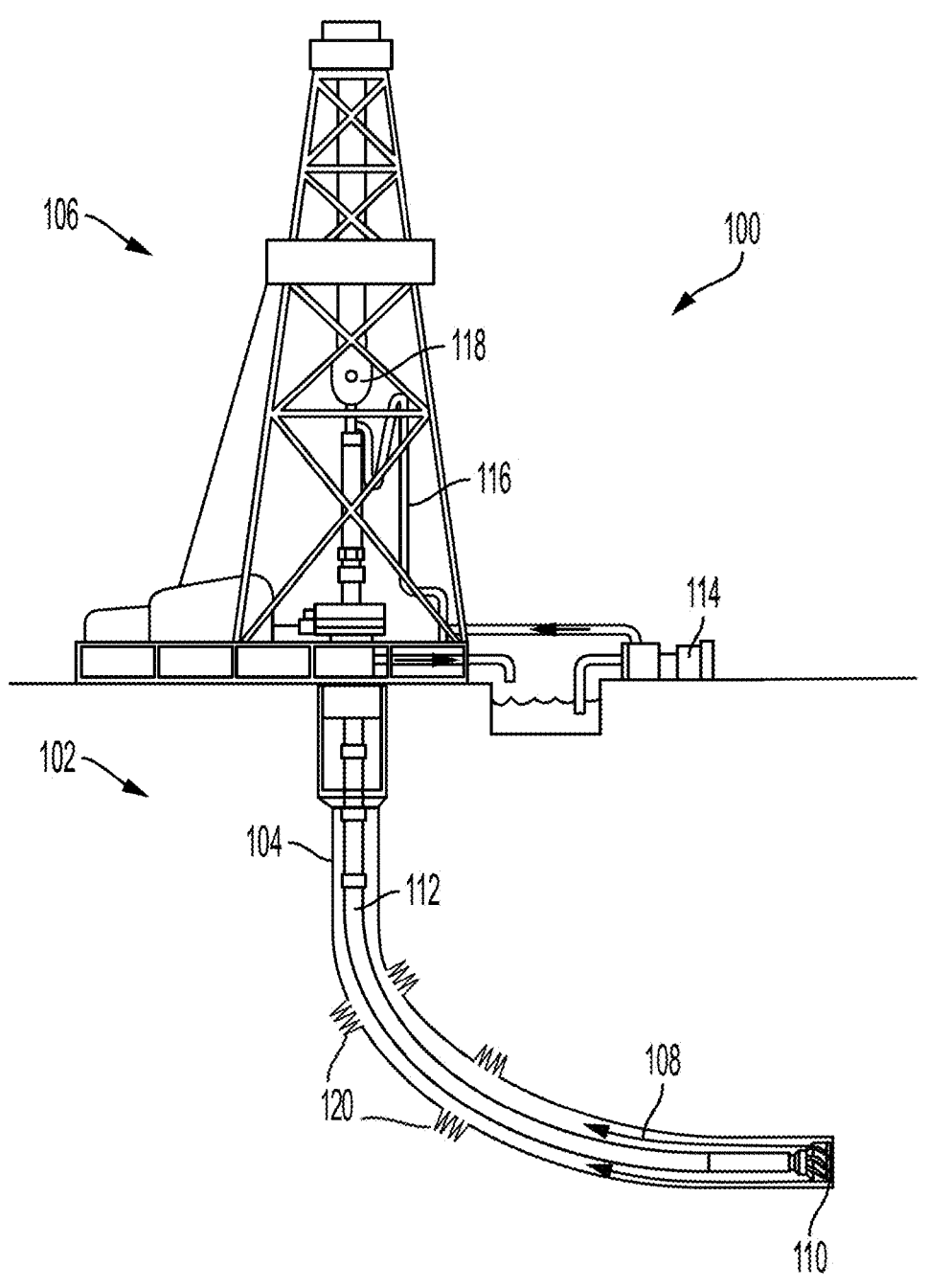
FIG. 1 is a schematic of a wellbore being drilled through a subterranean formation during which a plugging material is employed to prevent the lost circulation of the drilling fluid according to one example of the present disclosure.

Certain aspects and examples of the present disclosure relate to thixotropic plugging material for wellbore operations, such as plugging lost-circulation locations or zones in a wellbore or performing a cementing operation. Thixotropy can be a time-dependent shear thinning property. For example, a thixotropic slurry can remain in a liquid state while the solution is stirred or shaken and can readily gel when under static conditions. Thixotropic behavior can be used in drilling operations to reduce or eliminate undesired losses from a weak subterranean formation. Thixotropic plugging materials can be injected into a wellbore to bond to a subterranean formation, seal the permeable zones in the wellbore, and prevent the loss of circulation of drilling fluids through the permeable zones within the wellbore. The thixotropic plugging material can be pumped downhole or otherwise positioned in the wellbore for treating a permeable zone within the subterranean formation to prevent or mitigate lost circulation.

Plugging material can include a lost circulation material that can range in particle size from 2 nanometers ($3.94*10^{-8}$ inches) to 5 millimeters (0.20 inches) Lost circulation materials can be used for treating lost circulation zones for treatment of fracture sizes that can range from 1 millimeter (0.04 inches) to 2 millimeters (0.80 inches). For example, a sodium silicate dispensed from a drilling string and a calcium chloride positioned in the annulus can come together near the lost circulation zone to form a gel also known as a gunk plug. Gunk plugs can be used as lost circulation materials. The gunk plug, in some examples, may be injected into the wellbore using multiple pumps and operators for injecting the solutions into the wellbore. The increased pumps and operators can thus increase the cost of drilling operations. For fracture sizes that are larger, such as, from 3 millimeters (0.12 inches) to 5 millimeters (0.20 inches) or larger, lost circulation materials may insufficiently fill the larger fracture zones that may result in fluid loss during the drilling operation. For example, the fracture sizes from 3 millimeters (0.12 inches) to 5 millimeters (0.20 inches) may be treated with plugging materials with large particles dispersed homogeneously in the material. The larger particles may additionally require additional pumps and operating lines due to the particle diameter being larger than the drill string diameter. The increase in pumps and lines for disposing the solutions to the lost circulation zones thus increasing the cost. Additionally, the continued loss of drilling fluids due to insufficient lost circulation material can decrease productivity of the wellbore operation and thus increasing the cost.

A thixotropic slurry material according to some examples may be used as a lost-circulation material to plug both small fracture (e.g., 1-millimeter (0.04 inches) to 2 millimeters (0.80 inches)) sizes and for large fracture (e.g., 3 millimeters (0.12 inches) to 5 millimeters (0.20 inches)) sizes within a subterranean formation. For example, the base thixotropic slurry material can include a clay mineral, a suspending agent, and a cement to form a dry blend. In some examples, the base thixotropic slurry material may have a first density of 11 ppg, that may be adjusted by adding additional components to the base thixotropic slurry material. For example, adding at least one of an epoxy resin composition, an amorphous silica, water, a set retarder, a foaming agent, a defoaming agent, glass beads, barite, calcium carbonate, or manganese tetroxide can generate a thixotropic slurry material with a different density from the base thixotropic slurry material. In some examples, the thixotropic slurry material may be pumped through the drill string and the annulus during drilling operations. The additional one or more components may improve the mechanical properties of the composition. In combination, the thixotropic slurry material may have improved compression strength while being capable of reducing the permeability of the lost circulation zone. By including the additional one or more components in the composition, a desired thixotropic behavior may be achieved. For example, the thixotropic slurry material may be easily injected to desired lost circulation zones and upon injection, the thixotropic slurry material may exhibit a decrease in gel time, which is the time that may pass for the thixotropic slurry to create a gel with a desired compression strength.

These illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a schematic of a wellbore 104 being drilled through a subterranean formation 102 during which a plugging material can be employed to prevent the lost circulation of the drilling fluid according to one example of the present disclosure. A drill rig 106 can be used for drilling the wellbore 104. A drill bit 110 may be mounted on the end of a drilling string 112 that includes multiple sections of drill pipe. The wellbore 104 may be drilled by using a rotary drive at the surface to rotate the drill string 112 and to apply torque and force to cause the drill bit 110 to extend through the wellbore 104. The drilling fluid may be displaced through the drill string 112 using one or more pumps 114. The drilling fluid may be circulated past the drill bit 110 and returned to the surface through the annulus of the wellbore 104, as indicated by the arrows 108, thereby removing drill cuttings (e.g., materials such as rock generated by the drilling) from the wellbore 104. The pump 114 may be in fluid communication with a Kelly 118 via a pipe 116 for transporting the drilling fluid from the pump 114 and through the drilling string 112 and back into the wellbore 104. Although not shown, additional conduits besides drill string 112 may also be disposed within the wellbore 104. In some examples, the subterranean formation 102 may be a sub-oceanic formation in which a wellbore may be drilled.

The subterranean formation 102 may include permeable zones 120 through which the drilling fluid may migrate from the wellbore 104 into the subterranean formation 102. These permeable zones 120 may be, for example fractures, fissures, streaks, voids, vugs, and the like. The presence of such permeable zones 120 in the subterranean formation 102 may cause the circulation of liquids or material during wellbore operations that may include drilling operations, cementing operations, or other suitable operations that may include injecting fluid within the wellbore. For example, during a drilling operation, a lost circulation zone may cause the circulation of the drilling fluid in the wellbore 104 to be lost such that the fluid does not flow back to the surface of the earth.

To maintain circulation of the drilling fluid in the wellbore 104, a thixotropic slurry material may be disposed into the wellbore 104 and allowed to set downhole with respect to the subterranean formation 102 at a location of lost circulation. In some examples, the thixotropic slurry can be injected into the wellbore 104 during a drilling operation for sealing a lost circulation zone where the fracture size is greater than 5 millimeters (0.20 inches). In some examples, the thixotropic slurry material may be injected into a wellbore and sufficient time may pass for the slurry to set within the lost circulation zone before a cementing operation to prevent the use of excess cementing material. The use of the thixotropic slurry material may reduce cost and production time by preventing the injection of excess liquids into the permeable zones 120 within the wellbore. The strength of the thixotropic slurry material may increase with time after being placed downhole.

While co-mingling or meeting with the favorable downhole conditions, the free-flowing thixotropic slurry material can be set to form a solid barrier within the permeable zone. The set slurry material may prevent the flow of drilling fluid from the wellbore into the permeable zone. The favorable conditions can include, for example, pH, salinity, water, temperature, and shear rate. And the thixotropic slurry mixture may rapidly develop compressive strength. The thixotropic slurry material can quickly set into a rigid sealing mass that is substantially impermeable to fluid (e.g., no fluid or only a small amount of fluid can pass through the mass). After setting, the thixotropic slurry material may not be able to be washed out of the permeable zones 120, and the circulation of the drilling fluid through the wellbore 104 may be resumed without concern that the drilling fluid may escape from the wellbore 104 into the subterranean formation 102.

After drilling the wellbore 104 is completed, drill string 112 and drill bit 110 may be removed from the wellbore 104 and a casing can be positioned in the wellbore 104. Primary cementing may then be performed by pumping a cement slurry down the casing and into the annulus between the casing and the wall of the wellbore 104. The thixotropic slurry material can block the permeable zones 120 and prevent the cement slurry from flowing into the subterranean formation 102. As a result, the hydrostatic pressure of the cement slurry may be maintained such that the slurry returns to the surface and forms a relatively strong cement column in the annulus of the wellbore 104.

The strength of the thixotropic slurry material can impact the ability of the material to seal the permeable zones 120 within a wellbore and prevent fluid loss. The strength of the thixotropic material may be impacted by the general composition of the base material used to produce the thixotropic slurry material. For example, the clay mineral and suspending agent may have synergistic properties, that upon combination with one another, may have improved mechanical properties that are desired when generating a thixotropic slurry. The selection of a lost circulation material may depend on the geological makeup of the subterranean formation. By selecting a thixotropic slurry material with improved performance to effectively plug the permeable zones 120 within the wellbore 104, operations can expand to geographic regions and subterranean formation types that would otherwise be inoperable. The composition of the base material for generating a base thixotropic slurry material may generally include a cement, a clay mineral, and a suspending agent.

Various types of cement can be included in the thixotropic slurry material described herein. In some examples, the cement can be a hydraulic cement and can include one or more of Portland cement, a pozzolana cement, a gypsum cement, a high alumina content cement, a slag cement, high magnesia content cement, shale cement, acid or base cement, fly ash cement, a zeolite cement system, a kiln cement system, microfine cement metakaolin, or pumice.

In some embodiments, the cement may be a non-hydraulic, such as, sorel cement. The composition of a sorel cement may include a magnesium oxide, magnesium chloride, and a set retarder, such as sodium hexametaphosphate. In some embodiments, the sorel cement may further include diutan gum, sepiolite clay and an appropriate amount of water to produce a thixotropic cement slurry using sorel cement. In some embodiments, the water may be present in an amount from about 25% to about 800% by weight of the base material. The resulting thixotropic cement slurry may have a density from 10 lb/gal (1.198 kg/$^L$) to 14 lb/gal (1.437 kg/$^L$). The sorel thixotropic cement slurry may be used during wellbore operations to prevent fluid loss during the wellbore operations. For example, the sorel thixotropic slurry can include magnesium chloride from about 5% bwots to about 70% bwots (e.g., 10% bwots, 15% bwots, 20% bwots, 25% bwots, 30% bwots, 40% bwots, 50% bwots, or 60% bwots). In some examples, the sorel thixotropic slurry may include a magnesium oxide from about 5% bwots to about 70% bwots (e.g., 10% bwots, 15% bwots, 20% bwots, 25% bwots, 30% bwots, 40% bwots, 50% bwots, or 60% bwots). In some examples, the sorel thixotropic slurry may include a set retarder, such as sodium hexametaphosphate in an amount about 0% bwots to about 20% bwots (e.g., 1% bwots, 2% bwots, 4% bwots, 8% bwots, 16% bwots, or 20% bwots) In some examples, the sodium hexametaphosphate may be present in an amount less than 1% bwots.

The base material used for generating a thixotropic slurry material may include a suspending agent. Various types of suspending agents can be included in the thixotropic slurry material described herein. In some examples, the suspending agent can be a polysaccharide such as diutan gum. In some embodiments, the suspending agent may be in powder form. For example, the suspending agent may be SA-1015™ suspending agent or alternatively WG-17™ suspending agent, available from Halliburton Energy Services, Inc. The suspending agent may be present in an amount from 0.1 weight percent to 4 weight percent by weight of the cement (e.g., 0.2% bwots 0.4% bwots, 0.8% bwots, 1.0% bwots, 2.0% bwots, 3.0% bwots, or 4.0% bwots).

The base material used for generating a thixotropic slurry material may further include a clay mineral. For example, suitable clays that may be used in the composition include, kaolnites, montmorillonite, bentonite, hydrous micas, attapulgite, sepiolite, and any other suitable clay mineral used by one skilled in the art. In some embodiments, the clay mineral may be a synthetic clay such as laponite. The clay mineral may be present in an amount from about 1 wt. % bwots to about 30 wt. % bwots. Where present, the clay mineral may be present in the base material in an amount sufficient to provide the desired compressive strength or cost, among other considerations.

Selecting a thixotropic slurry material with improved mechanical or physical properties may include adding, to the thixotropic slurry material, means of altering the density to a range of 9 lb/gal (1.078 kg/L) to 16 lb/gal (1.917 kg). For example, adding at least one of an epoxy resin composition, an amorphous silica, a set retarder, a foaming agent, a defoaming agent, glass beads, barite, calcium carbonate, or manganese tetroxide can change the density from the base density to a second density.

In some embodiments, the thixotropic slurry material can include an epoxy resin or combination of multiple epoxy resins. For example, an epoxy resin can include a diglycidyl ether functionalized molecule or any multifunctional glycidyl ether molecule. The diglycidyl ether molecule can be non-polymeric. In some examples, the epoxy resin can be a butyl glycidyl ether, a cyclohexanedimethanol diglycidyl ether, diglycidyl ether of bisphenol A, cyclohexane dimethanol diglycidyl ether, an epoxidized bisphenol, or any combinations thereof. In some embodiments, the epoxy resin composition may include an R1 and an R2 wherein R1 is different from R2. For example, the thixotropic slurry material can include a combination of a butyl glycidyl ether (R1) and a cyclohexanedimethanol diglycidyl ether (R2) and R1, R2, or a combination thereof, can be present in an amount of about 5% to about 50% by weight of thixotropic slurry. Additionally, a hardener can be included in the thixotropic slurry material in combination with the epoxy resin composition. The hardener can include a compound consisting of aliphatic amines, aliphatic tertiary amines, aromatic amines, cycloaliphatic amines, heterocyclic amines, amidoamines, polyamides, polyethyleneamines, and carboxylic acid anhydrides. In certain examples, the aliphatic and aromatic amines can be triethylenetetramine, ethylenediamine, Ncocoalkyltrimethylenediamine, isophoronediamine, diethyltoluenediamine, and tris(dimethylaminomethylphenol). In certain examples, the carboxylic acid anhydrides are methyltetrahydrophthalic anhydride, hexahydrophthalic anhydride, maleic anhydride, polyazelaic polyanhydride and phthalic anhydride. In some examples, the thixotropic slurry material can include from about 1 wt. % by weight of thixotropic slurry to about 50 wt. % by weight of thixotropic slurry of the hardener.

The thixotropic slurry material that includes the resin and the hardener can further include an accelerator that may accelerate the epoxy curing reaction within the thixotropic slurry material. In some examples, the hardener may be the accelerator in the thixotropic slurry material. In certain examples, the accelerator can include a compound consisting of tertiary amines, carboxylic acids, and alcohols (especially phenols). For example, the accelerator can be 2,4,6-tridimethylaminomethylphenol. In some examples, the accelerator may be included in a thixotropic slurry material from about 0.5 wt. % by weight of thixotropic slurry to about 50% by weight of thixotropic slurry.

Some factors considered when selecting a thixotropic slurry material include compressive strength, thickening time, and gel strength. Compressive strength of a material can be determined over time as the material cures under downhole temperature and pressure conditions using ultrasonic cement analyzers (UCA). Thickening time is a measure of the time that the slurry remains in a fluid state and is capable of being pumped. Thickening time is generally assessed under downhole conditions as a function of consistency or pumpability. Gel strength is a measure of shear stress at a low shear rate after a material has set quiescently for a set period of time. Time measurements for gel strength determination can be ten minutes/ten seconds at 80° F. (27° C.) to 190° F. (88° C.) at atmospheric pressure.

In some examples, the material described herein can have an ultimate compressive strength over 50 psi (345 kPa). In other examples, the thixotropic slurry material can have a 10-second gel strength of at least 20 lbf/100 ft$^2$ (97 kg/m$^2$) at 80° F. (27° C.). In certain examples, the material can have a 10-second gel strength of at least 25 lbf/100 ft$^2$ (122 kg/m$^2$) at 80° F. (27° C.). in some examples, the material can have a 10-minute gel strength of at least 50 lbf/100 ft$^2$ (244 kg/m$^2$) at 80° F. (27° C.). In certain examples, the material can have a 10-minute gel strength of at least 50 lbf/100 ft$^2$ (488 kg/m$^2$) at 80° F. (27° C.). In certain examples, the material can have a 10-minute gel strength of at least 100 lbf/100 ft$^2$ (976 kg/m$^2$) at 130° F. (54° C.). In certain examples, the material can have a 10-second gel strength of at least 15 lbf/100 ft$^2$ (73 kg/m$^2$) at 130° F. (54° C.).

The material may be positioned in the wellbore to substantially seal one or more permeable or fracture zones in the wellbore and prevent or help prevent a loss of circulation of drilling fluids and cement slurries through the permeable zones 120. In certain examples, the material may be positioned in a lost circulation zone of a wellbore. In some examples, methods of using the thixotropic slurry material can include providing a material comprising cement, a clay mineral such as sepiolite, and a suspending agent; contacting a lost circulation zone in a wellbore with the material; and allowing the material to set in the lost circulation zone. In certain examples, the clay mineral may be present in an amount from about 1 wt. % by weight of cement to about 30 wt. % by weight of cement. The amorphous silica can include silicalite, silica fume, fly ash, or any other suitable silica known to one skilled in the art. In some embodiments, the silica is present in an amount of 5 weight percent to 150 weight percent by weight of the cement.

Figure 2:
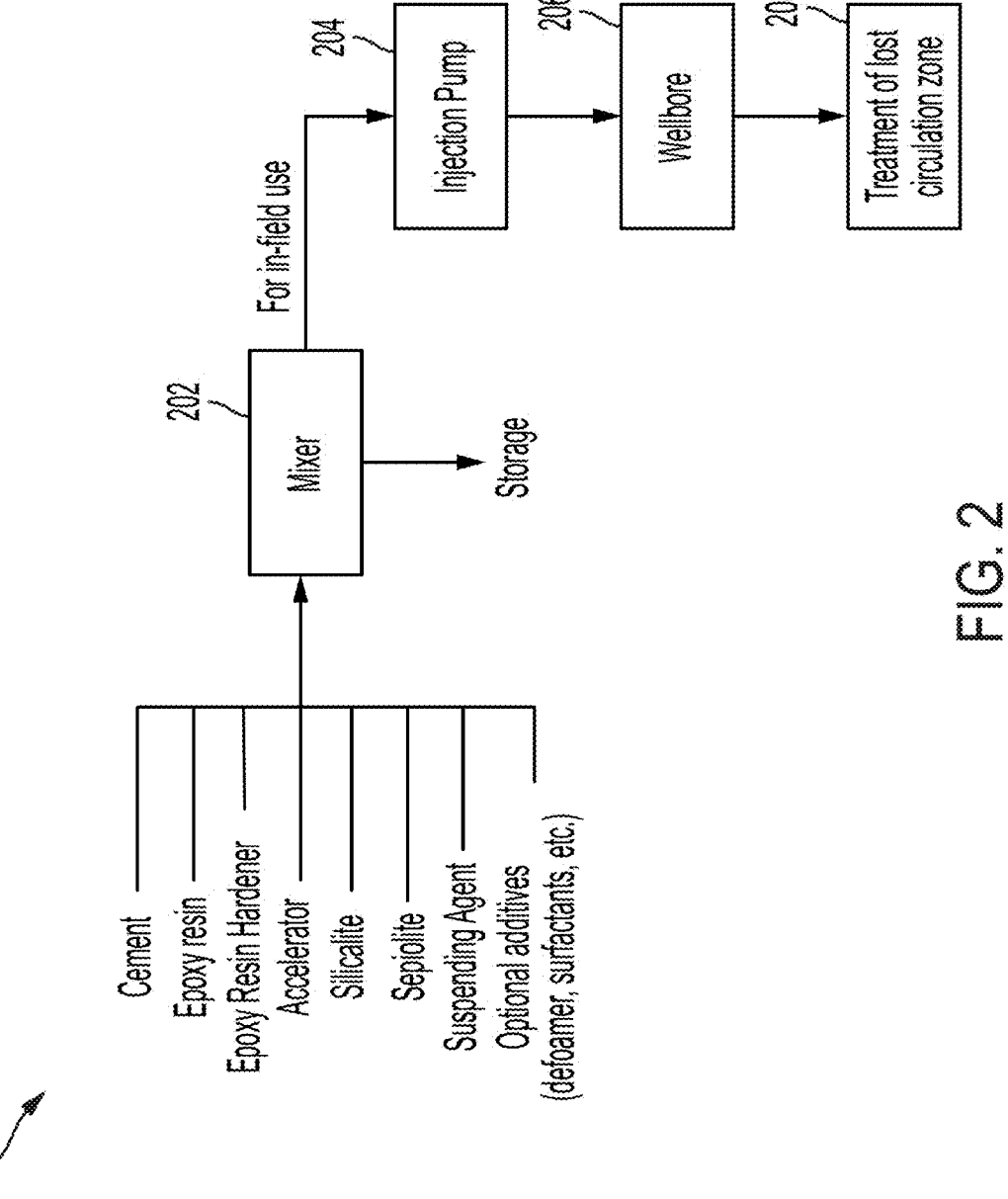
FIG. 2 is a block diagram showing mixing a thixotropic slurry material for use within a wellbore to treat a lost-circulation zone according to one example of the present disclosure.

FIG. 2 is a block diagram 200 showing mixing of a thixotropic slurry material for use within a wellbore to treat a lost-circulation zone according to one example of the present disclosure. In some examples, the material described herein can be prepared using a batch mixing process. In other examples, the material can be prepared in a continuous manner or "on the fly" at the wellbore. The thixotropic slurry composition can be mixed in a mixer 202 for generating the slurry material. The thixotropic slurry material can be optionally stored for future use or can be injected into the wellbore via an injection pump 204. The injection pump 204 can inject the thixotropic slurry material into the wellbore 206 for treatment of the lost circulation zone 208 within the subterranean formation. In some examples, the method can include agitating the mixture with the high shear mixer. In certain examples, the method of injecting the thixotropic slurry material can include providing a slurry material that may include a cement, an epoxy resin, an epoxy resin hardener, an accelerator, an amorphous silica, a sepiolite, and a suspending agent. The slurry material can be mixed in a mixer 202 that can continuously agitate the slurry material. The thixotropic slurry material can then be injected into a wellbore to contact a lost circulation zone in a wellbore with the material. The thixotropic slurry material can be positioned at the lost circulation zone and can be undisturbed for a predetermined time length to perform a lost circulation operation within the wellbore.

The thixotropic slurry material can include other additives such as a defoamer or surfactants that can be added in the thixotropic slurry before the material is injected via an injection pump 204 into the wellbore 206.

Figure 3:
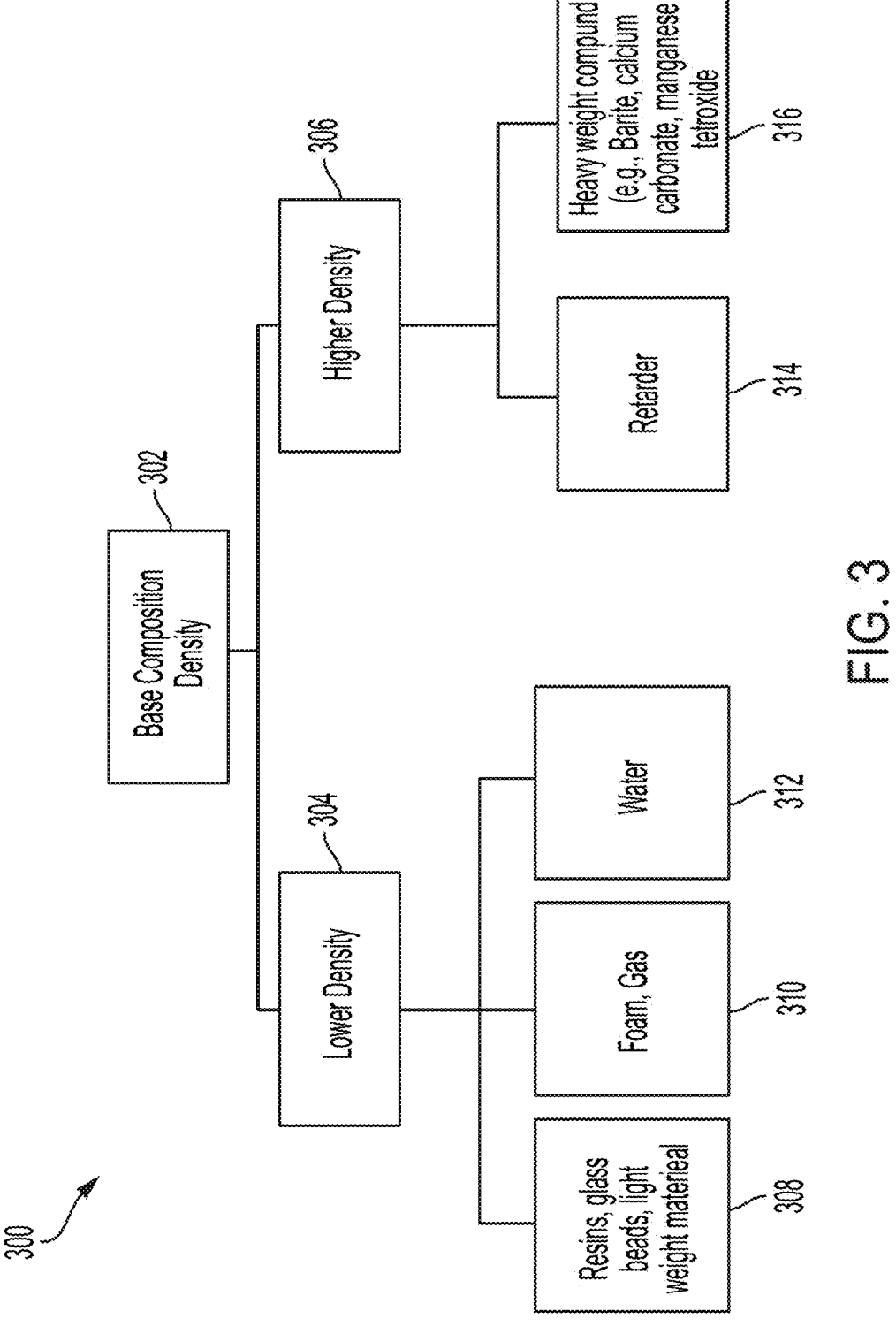
FIG. 3 is a block diagram showing changes to the composition base density for adjusting the density of a thixotropic slurry material for use within a wellbore to treat a lost-circulation zone according to one example of the present disclosure.

FIG. 3 is a block diagram showing changes to the composition base density 302 for adjusting the density of a thixotropic slurry material for use within a wellbore to treat a lost-circulation zone according to one example of the present disclosure. The thixotropic slurry material can have a composition base density 302, for example, the base density may be 11 pounds per gallon (lb/gal or ppg) (1.318 kg/L) that can be manipulated to either increase 306 or decrease 304 the density. The density of the thixotropic slurry material can be manipulated for a pre-selected density by an operator that can be used to plug a lost circulation zone within the wellbore. In some examples, the density of the thixotropic slurry can be below 16 lb/gal (1.917 kg/L). In certain examples, the thixotropic slurry can have a density below 12 lb/gal (1.437 kg/$^L$). A thixotropic slurry material with a density of between 10 lb/gal (1.198 kg/$^L$) to 14 lb/gal (1.437 kg/$^L$) can be used for plugging a lost circulation zone within a wellbore. For example, the thixotropic slurry material may have a base density that can be manipulated to a different density by adding, to the base thixotropic slurry, water, an epoxy resin composition, a foaming agent, a defoaming agent or glass beads to reduce the density and make a different thixotropic slurry material.

In some examples, the base thixotropic material may be a dry blend. For example, the dry blend can include a cement, a clay mineral, and a suspending agent. The base composition can include adding, to the base composition, a resin composition to decrease the density of the slurry material. The resin composition can include a first epoxy resin, a second epoxy resin, an epoxy resin hardener, and an epoxy resin accelerator. In some examples, the first epoxy resin can include a butyl glycidyl ether and the second epoxy resin can include a cyclohexanedimethanol diglycidyl ether. The epoxy resin hardener can include a compound consisting of aliphatic amines, aliphatic tertiary amines, aromatic amines, cycloaliphatic amines, heterocyclic amines, amidoamines, polyamides, polyethyleneamines, and carboxylic acid anhydrides. The epoxy resin accelerator can include a compound consisting of tertiary amines, carboxylic acids, and alcohols (especially phenols). In certain examples, the resin composition may be added to the base composition to decrease the density below 11 lb/gal (1.318 kg/L). In some examples, the dry blend can include a non-hydraulic cement, a clay mineral, a suspending agent, and a set retarder. The non-hydraulic cement can include a magnesium oxide and a magnesium chloride.

For example, the base composition can include adding, to the thixotropic slurry material, a retarder 314 to increase the density. The retarder can include a compound including an organo phosphoric acid, a modified sulfonated styrene-maleic anhydride polymer, lignosulfonate, a polyacrylic acid, or any combination thereof. In certain examples, the base thixotropic slurry material density can be increased, for example, to a density above 11 lb/gal (1.318 kg/L) by adding, to the thixotropic slurry, a heavy weight compound 316 that can include barite, calcium carbonate, manganese tetroxide, or any combination thereof. The thixotropic slurry can, for example, have a density less than 16 lb/gal (1.917 kg/L). In certain examples, the density can be at least 9 lb/gal (1.078 kg/L) and below 16 lb/gal (1.917 kg/L). In other examples, the thixotropic slurry can have a density for 10 lb/gal (1.198 kg/L) to 12 lb/gal (1.437 kg/L).

In some examples, the thixotropic slurry material can include other solids for increasing or decreasing the density of the base composition. For example, the solid material can include beaded, cubic, bar-shaped, cylindrical, or mixtures thereof. The solid materials may include silica, barite, cellulose fibers, carbon fibers, glass fibers, mineral fibers, plastic fibers, metallic fibers, metal shavings, Kevlar fibers, basalt fibers, wollastonite, micas, and mixtures thereof.

The base thixotropic slurry density can be decreased, for example, by adding, to the thixotropic slurry material, a lightweight material 308 that can include resins or glass beads. In certain examples, the density can be decreased by adding a foaming agent or gas. For example, the gas that can be added can include, among others, an inert gas. Additionally, water can be added to decrease the density of the thixotropic slurry material. In some examples, water can include fresh water, brackish water, or saltwater. The water can be added to the thixotropic slurry material for adjusting the density of the slurry composition. In some examples, the water can be included to decrease the density of the slurry composition.

Example 1: Density Variation on Thixotropic Slurry Physical and Mechanical Properties Five batches of thixotropic slurries were prepared. Examples 1-3 listed in Table 1 include a hydraulic cement, an amorphous silica, a clay mineral, a suspending agent, and a foaming agent. Example 4 listed in table 2 includes a mixture of Example 1 from table 1 and the resin composition of table 2 and Example 5 listed in table 2 includes a mixture of Example 3 from table 1 and the resin composition from table 3. Examples 4 and 5 were mixed using a waring blender at 4000 rpm to form the respective slurry materials. The density of examples 1-3 were 10.5 lb/gal (1.258 kg/L), 11.0 lb/gal (1.318 kg/L), and 11.5 lb/gal (1.318 kg/L), respectively, while example 4 and example 5 had a density of 10.0 lb/gal (1.198 kg/L) and 11.0 lb/gal (1.318 kg/L), respectively. Example 4 composition in table 2 includes a combination of 65% bwots of example 1 from Table 1 and 35% bwots of the resin mixture from Table 3. Example 5 composition in table 2 includes a combination of 80% bwots of example 3 from Table 1 and 20% bwots of the resin mixture from Table 3.

TABLE 1

| | Example 1 | Example 2 | Example 3 |
|---|---|---|---|
| Cement Density | 10.5 lb/gal | 11 lb/gal | 11.5 lb/gal |
| Resin Density | — | — | — |
| Final Density | 10.5 lb/gal | 11 lb/gal | 11.5 lb/gal |
| Class G Cement (g) | 104.9 | 150.6 | 179.7 |
| Silicalite ™ | 46.8 | 37.6 | 44.9 |
| Sepiolite (g) clay mineral (g) | 8.4 | 5.5 | 4.9 |
| SA-1015 ™ suspending agent (g) | 1.20 | 0.78 | 0.70 |
| Water (g) | 341.6 | 332.6 | 320.6 |
| D-AIR 3000L ™ defoamer (g) | 0.4 | 0.4 | 0.4 |

TABLE 2

| | Example 4 | Example 5 |
|---|---|---|
| Cement Density | 10.5 lb/gal | 11.5 lb/gal |
| Resin Density | 9.2 lb/gal | 9.2 lb/gal |
| Final Density | 10 lb/gal | 11 lb/gal |
| Class G Cement (g) | Combination | Combination |
| Silicalite ™ | of 65% by wt. | of 80% by wt. |
| Sepiolite (g) clay mineral(g) | Example 1 | Example 3 |
| SA-1015 ™ suspending agent(g) | and 35% | and 20% |
| Water (g) | by wt. Resin | by wt. Resin |
| D-AIR 3000L ™ defoamer (g) | | |

TABLE 3

| Resin Composition | |
|---|---|
| Density | 9.2 lb/gal |
| R1 (resin 1) | 200 gm |
| R2 (resin 2) | 66.6 gm |
| H1 (hardener 1) | 77.4 gm |
| A2 (accelerator 2) | 4.0 gm |

The slurries were tested for rheological behavior and gel strength using a FANN® rheometer using a Fann Yield Stress Adapter (FYSA). All tests were performed using American Petroleum Institute recommended practices (API RP 10B-2). The test results can be summarized in Table 4, below. The FYSA rheology was tested at 300 revolution per minute (rpm), 200 rpm, 100 rpm, 6 rpm, and 3 rpm. Example 4 demonstrates a higher rheology when compared to both example 1 and 2 while maintaining a lower density than both compositions. For example, the 300 rpm of examples 1 and 2 were 25 and 24, respectively while example 1 demonstrated an FYSA rheology demonstrated a rheology of 42 and 300 rpm. Example 5 demonstrated an increased rheology when compared to example 2 and 3 while comprising a lower density than example 3. Additionally, example 5 demonstrated an increased rheology when compared to example 2 that had the same density. The results demonstrate that a thixotropic slurry that may include a cement mixture and a resin mixture may have a density lower than current methods while providing an increased rheology strength.

TABLE 4

| Rheology FYSA | Example 1 80° F. | Example 2 80° F. | Example 3 80° F. | Example 4 80° F. | Example 5 80° F. |
|---|---|---|---|---|---|
| 300 | 25 | 24 | 28 | 42 | 31 |
| 200 | 20 | 18 | 23 | 35 | 25 |
| 100 | 17 | 13 | 18 | 27 | 20 |
| 6 | 13 | 8 | 18 | 16 | 15 |
| 3 | 12 | 7 | 14 | 15 | 15 |
| 10-sec. gel strength (lbf/100 ft$^2$) | 23 | 16 | 32 | 27 | 35 |
| 10-min gel strength (lbf/100 ft$^2$) | 120 | 92 | 132 | 110 | 94 |

The 10-second gel strength of Examples 4 and 5 were greater than examples 1-3 with similar densities. Similarly, the 10-minute gel strength were greater than examples 1-3 with similar densities. For example, Example 4 has a density of 10 lb/gal (1.198 kg/L) and example 1 has a density of 10.5 lb/gal (1.258 kg/L). Example 4 demonstrated a 10-second gel strength of 27 (lbf/100 ft$^2$) (131 kg/m$^2$) while example 1 demonstrated a 10-second gel strength of 23 (lbf/100 ft$^2$) (112 kg/m$^2$). Examples 4 and 5 demonstrate that a thixotropic slurry material can have a density lower than current lost circulation materials while demonstrating characteristics that may be advantageous for lost circulation zones. For example, Examples 4 and 5 demonstrated a 10-minute gel strength of 110 (lbf/100 ft$^2$) (537 kg/m$^2$) and 94 (lbf/100 ft$^2$) (458 kg/m$^2$) while comparative example 2 demonstrated a 10-minute gel strength of 92 (lbf/100 ft$^2$) (449 kg/m$^2$).

The slurries were also tested for properties indicative of in-field performance. The compressive strength (at 100° F. (38° C.)) result as determined by an ultrasonic cement analyzer according to method API RP 10B-2 for examples 1-3 and examples 4 and 5. The results of the compressive strength is provided in Table 5.

TABLE 5

| UCA at 100° F. (38° C.) | Example 1 | Example 2 | Example 3 | Example 4 | Example 5 |
|---|---|---|---|---|---|
| 100 PSI (689 kPa), (hr: min) | 46:08 | >24 | 19:04 | 16:08 | 14:38 |
| 24 hr, (psi) | 32 | 62 | 117 | 147 | 198 |

The thixotropic slurry material of examples 4 and 5 had compressive strengths of 147 and 198 respectively and were higher than the compressive strength of examples 1-3. In some examples, the lost circulation material can be selected for permeable zones to seal the permeable zones in the wellbore and prevent the loss of circulation of drilling fluids through the permeable zones within the wellbore. A desired characteristic of a lost circulation material can include a composition that may reach a desired compressive strength in the least amount of time. In some examples, the time to reach a compressive strength of 100 psi (689 kPa) can be below 24 hours. In some examples, the compressive strength of 100 psi (689 kPa) may be achieved in under 20 hours. In certain examples, the material should have a compressive strength of 100 psi (689 kPa) in under 18 hours.

Example 2: Synergy Between Silica Fume, Diutan and Sepiolite Clay on Thixotropic Slurry Physical and Mechanical Properties

TABLE 6

| Slurry Components | Weight (g) |
|---|---|
| Class G Cement | 100 |
| Blend of Silica Fume, Diutan and Sepiolite | 50 |
| Defoamer | 0.5 |
| Water | 452.2 |

To verify the synergistic effect between silica fume, diutan, and sepiolite, eight experiments were carried out by preparing eight different blends with varying weight % of individual components. Then a cement slurry was mixed as per the composition given in table 6 and tested for rheology, gel strength, and compressive strength. The target density for the compositions was 10 lb/gal (1.198 kg/$^L$). The target mixability rating was between 3 to 5, with the results given in table 7.

TABLE 7

| Blend | 1 | 2 | 3 | 4 | 5 | 6 | 7 | 8 |
|---|---|---|---|---|---|---|---|---|
| Silica Fume, % in blend | 78 | 90 | 90 | 77 | 79 | 89 | 83 | 83.1 |
| Diutan, % in blend | 2 | 2 | 1 | 3 | 1 | 3 | 2.1 | 3 |
| Sepiolite, % in blend | 20 | 8 | 9 | 20 | 20 | 8 | 14.9 | 13.9 |
| Mixability rating | 4 | 4 | 5 | 2 | 4 | 2 | 4 | 2 |
| Rheology and Gel Strength on FYSA at 130° F. | | | | | | | | |
| 300 rpm | 23 | 19 | 10 | 29 | 11 | 29 | 19 | 29 |
| 200 rpm | 18 | 15 | 7 | 25 | 8 | 25 | 15 | 26 |
| 100 rpm | 14 | 12 | 4 | 2 | 4 | 21 | 12 | 22 |
| 6 rpm | 9 | 9 | 3 | 16 | 3 | 15 | 8 | 17 |
| 3 rpm | 9 | 9 | 3 | 16 | 3 | 15 | 8 | 17 |
| 10 sec gel, lbf/100 ft$^2$ | 19 | 13 | 8 | 26 | 10 | 21 | 16 | 25 |
| 10 min gel, lbf/100 ft$^2$ | 120 | 65 | 61 | 122 | 62 | 58 | 104 | 86 |
| Compressive Strength at 150° F. | | | | | | | | |
| Time for 50 psi (hr:min) | 06:34 | 06:24 | 05:57 | 06:18 | 05:42 | 06:02 | 06:37 | 06:42 |
| Time for 100 psi (hr:min) | 08:23 | 07:56 | 07:16 | 08:03 | 07:06 | 07:40 | 08:14 | 08:48 |

Based on the results, Blends 1 and 7 shows a good mixability rating with rapid gel strength and compressive strength development. In particular, blend 1 had a mixability rating of 4 and a 10-minute gel strength of 120 lbf/100 ft$^2$, while blend 7 had a mixability rating of 4 and a 10-minute gel strength of 104 lbf/100 ft$^2$. Interestingly, blend 4, with 3% Diutan and 77% Silica Fume had a higher 10-minute gel strength of 122 lbf/100 ft$^2$ while demonstrating a lower mixability rating of 2, thus indicating that the composition with minor alterations may impact the mixability rating. To further investigate the synergy of the materials used in the cement slurry, a source-to-source variation in Silica fume and Sepiolite clay as well as a batch-to-batch variation experiment was performed. The source-to-source variation in silica fume is shown below in Table 8. The blend composition used for testing the source-to-source variation was blend 7 from table 7, above. The composition was kept consistent with a density of 10 lb/gal (1.198 kg/$^L$). In brief, the composition used to test the source-to-source variability in the Silica Fume was as follows: 83% Silica Fume, 2.1% Diutan, and 14.9% Sepiolite.

TABLE 8

| Manufacturer of Silica Fume | Ferroglobe-USA | Wuhan Dict. China | Banfam-India | Elkem |
|---|---|---|---|---|
| Mixability rating | 4 | 4 | 5 | 5 |
| Rheology and Gel Strength on FYSA at 130° F. | | | | |
| 300 rpm | 17 | 16 | 16 | 16 |
| 200 rpm | 12 | 11 | 12 | 12 |
| 100 rpm | 9 | 8 | 9 | 8 |
| 6 rpm | 7 | 6 | 5 | 6 |
| 3 rpm | 7 | 5 | 4 | 5 |
| 10 sec gel, lbf/100 ft$^2$ | 20 | 15 | 8 | 9 |
| 10 min gel, lbf/100 ft$^2$ | 128 | 122 | 47 | 83 |
| Compressive Strength at 150° F. | | | | |
| Time for 50 psi (hr: min) | 05:28 | 06:06 | 08:23 | 06:34 |
| Time for 100 psi (hr: min) | 07:17 | 08:13 | 11:13 | 08:46 |

As can be seen from Table 8, the source of the Silica Fume can impact the physical and mechanical properties of the thixotropic cement slurry. For example, the Silica Fume sourced from Ferroglobe-USA had a 10 min gel, lbf/100 ft$^2$ of 128 while the Banfam-India source had a 10 min gel, lbf/100 ft$^2$ of 47. The compressive strength of the USA sourced Silica fume reached a compressive strength of 50 psi and 100 psi in 5 hours and 28 minutes and 7 hours, 17 minutes, respectively. The India sourced Silica Fume reached a compressive strength of 50 psi and 100 psi in 8 hours, 23 minutes, and 11 hours 13 minutes, respectively. The results demonstrate that the source of the silica fume can impact both the gel strength and the compressive strength of the thixotropic slurry. After investigating the source-to-source variations in the Silica Fume, a batch-to-batch variation was investigated. The Silica Fume from Wuhan was used and the results of different batches of Silica fume is shown in Table 9, below. The composition of the cement was consistent with the composition used in Table 8; the difference is the source of the Silica Fume was from three independent Silica Fume batches from Wuhan.

TABLE 9

| Silica Fume Batch Number | #1 | #2 | #3 |
|---|---|---|---|
| Mixability Rating | 4 | 4 | 4 |
| Rheology and Gel Strength on FYSA at 130° F. | | | |
| 300 rpm | 16 | 17 | 19 |
| 200 rpm | 11 | 12 | 15 |
| 100 rpm | 8 | 10 | 13 |
| 6 rpm | 6 | 7 | 9 |
| 3 rpm | 5 | 6 | 8 |
| 10 sec gel, lbf/100 ft$^2$ | 15 | 17 | 19 |

TABLE 9-continued

| Silica Fume Batch Number | #1 | #2 | #3 |
|---|---|---|---|
| 10 min gel, lbf/100 ft$^2$ | 122 | 127 | 113 |
| Compressive Strength at 150° F. | | | |
| Time for 50 psi (hr: min) | 06:06 | 05:48 | 05:22 |
| Time for 100 psi (hr: min) | 08:13 | 07:51 | 07:25 |

The batch variation did not impact the mixability of the cement slurry while having an impact on the gel strength and compressive strength. For example, batch 1 had a 10 sec gel, lbf/100 ft$^2$ of 15 and a 10 min gel, lbf/100 ft$^2$122 while batch #3 had a 10 sec gel, lbf/100 ft$^2$ of 19 and a 10 min gel, lbf/100 ft$^2$113. Batch #1 reached a 50 psi compressive strength in 6 hours and 6 minutes while batch #3 took 5 hours and 22 minutes. The results demonstrate that the batch-to-batch variation can impact the cement slurry physical and mechanical properties.

As can be seen above, the Silica Fume source and batch change may impact the physical and mechanical properties of the cement slurry. Given the variation in the source difference in the Silica Fume, an investigation into the source to source and batch to batch variability in sepiolite clay was also investigated. The source-to-source variation was carried out using the same density (10 lb/gal, 1.198 kg/$^L$) as above, and blend 7 composition from table 7 (83% Silica Fume, 2.1% Diutan, and 14.9% Sepiolite). The results of the sourced Sepiolite may be found in table 10, below.

TABLE 10

| Manufacturer of Sepiolite | LHOIST (USA) | Proec (India) | Xiangton (China) | Tolsa (Spain) |
|---|---|---|---|---|
| Mixability Rating | 4 | 4 | 5 | 5 |
| Rheology and Gel Strength on FYSA at 130° F. | | | | |
| 300 rpm | 17 | 21 | 15 | 15 |
| 200 rpm | 12 | 18 | 10 | 11 |
| 100 rpm | 9 | 14 | 8 | 8 |
| 6 rpm | 7 | 10 | 8 | 5 |
| 3 rpm | 7 | 9 | 5 | 4 |
| 10 sec gel, lbf/100 ft$^2$ | 20 | 22 | 9 | 11 |
| 10 min gel, lbf/100 ft$^2$ | 128 | 134 | 74 | 87 |
| Compressive Strength at 150° F. | | | | |
| Time for 50 psi (hr: min) | 05:28 | 05:47 | 06:02 | 06:17 |
| Time for 100 psi (hr: min) | 07:17 | 08:02 | 07:55 | 08:36 |

The source variation of the sepiolite clay had a variability in the mixability rating from each individual source. The rheology and gel strength of the slurry composition demonstrated that the source had an impact on both the 10 sec gel, lbf/100 ft$^2$ and 10 min gel, lbf/100 ft$^2$ as demonstrated above in Table 10. There was also a variability noticed in the Compressive strength of the cement slurry, for example, the U.S.A. source of sepiolite clay had a 50 psi compressive strength in 5 hours and 28 minutes while the Spain sourced silica fume had a 50 psi compressive strength in 6 hours and 17 minutes. The variation in compressive strength may impact wellbore operations. Thus, a reduced source variation and batch variation may be sought after to reduce variability in wellbore operations. To further investigate the batch-to-batch variation of sepiolite clay, three independent batches were purchased from Proec (India) were used to make the cement slurry. The results of the batch-to-batch variability may be found in Table 11, below.

TABLE 11

| Sepiolite Batch Number | #1 | #2 | #3 |
|---|---|---|---|
| Mixability Rating | 4 | 4 | 4 |
| Rheology and Gel Strength on FYSA at 130° F. | | | |
| 300 rpm | 21 | 24 | 25 |
| 200 rpm | 18 | 19 | 20 |
| 100 rpm | 14 | 15 | 16 |
| 6 rpm | 10 | 12 | 14 |
| 3 rpm | 9 | 11 | 14 |
| 10 sec gel, lbf/100 ft$^2$ | 22 | 26 | 32 |
| 10 min gel, lbf/100 ft$^2$ | 134 | 154 | 151 |
| Compressive Strength at 150° F. | | | |
| Time for 50 psi (hr: min) | 05:47 | 05:38 | 05:52 |
| Time for 100 psi (hr: min) | 08:02 | 07:26 | 07:45 |

From the 3 batches, a variability in the rheology, gel strength, and compressive strength may be noticed. For example, Batch #1 had a 10 sec gel, lbf/100 ft$^2$ of 22 while batch #3 had a 32 10 sec gel, lbf/100 ft$^2$. Similarly, the 10 min gel, lbf/100 ft$^2$ of Batch #1 was 134 and batch #3 had a 10 min gel, lbf/100 ft$^2$ of 151. The compressive strengths showed variability in time to reach a 100 psi compressive strength (from batch #1, 8 hours and 2 minutes, and batch #3 achieved the compressive strength in 7 hours and 45 minutes). The results from the source-to-source variation as well as the batch-to-batch variation may demonstrate the need for a single sack cement blend that may be used to generate a thixotropic slurry for use in wellbore operations, such as preventing loss circulation during drilling operations.

Example 3: Sorel Cement Thixotropic Slurry Composition and Resulting Mechanical Properties Three batches of thixotropic slurries were prepared. Examples 1-3 listed in Table 1 include a magnesium oxide, a magnesium chloride, a clay mineral, a suspending agent, a set retarder, and water. Examples 6, 7 and 8 were prepared by mixing using a waring blender at 4000 rpm to form the respective slurry materials. In brief, water was first added to the warring blender. To the blender was added the sodium hexametaphosphate slowly and mixed for 4 minutes. Once fully dissolved, the magnesium chloride was added and mixed for 5 minutes at 4,000 rpm to ensure the magnesium chloride fully dissolved. The final step included adding the diutan gum, sepiolite clay and magnesium oxide to the blender followed by mixing at 4,000 rpm for 3 minutes. The density of examples 6-8 were 14.0 lb/gal (1.677 kg/L). Prior to rheology, gel strength, and compressive strength testing, the slurry compositions of examples 6-8 were conditioned at 90° F. for 30 minutes on an atmospheric consistometer. The compositions are shown in Table 12, below, with the resulting rheology, compressive strength and gel strength shown in Table 13, below.

TABLE 12

| Components | Example 6 | Example 7 | Example 8 |
|---|---|---|---|
| Magnesium Oxide (g) | 231.9 | 231.9 | 231.9 |
| Magnesium Chloride (g) | 231.9 | 231.9 | 231.9 |
| Sodium hexametaphosphate (g) | 4.6 | 4.6 | 4.6 |
| Sepiolite (g) | 24.3 | — | 24.3 |
| Diutan gum (g) | 3.5 | 3.5 | — |
| Water (g) | 174.8 | 174.8 | 174.8 |

TABLE 13

| Rheology and Gel Strength | Example 6 | Example 7 | Example 8 |
|---|---|---|---|
| 300 rpm | 39 | 34 | 29 |
| 200 rpm | 31 | 25 | 24 |
| 100 rpm | 23 | 17 | 20 |
| 6 rpm | 19 | 5 | 15 |
| 3 rpm | 17 | 4 | 13 |
| 10 sec gel, lbf/100 ft$^2$ | 50 | 5 | 34 |
| 10 min gel, lbf/100 ft$^2$ | 185 | 10 | 112 |
| UCA Compressive Strength at 90° F./3000 psi | | | |
| Time for 50 psi (hr: min) | 08:13 | Settling | 11:00 |
| Strength in 24 hours, psi | 2245 | | 2193 |

Example 6 that includes both diutan gum and sepiolite shows a rapid gel strength development and compressive strength while example 7 included diutan with no sepiolite. The results of the compressive strength and gels strength were lower than example 6. For example, example 6 had a 10 sec gel, lbf/100 ft$^2$ of 50 and a 10 min gel, lbf/100 ft$^2$ of 185, while design 2 had a 10 sec gel, lbf/100 ft$^2$ of 5 and a 10 min gel, lbf/100 ft$^2$ of 10. Example 8 had a 10 sec gel, lbf/100 ft$^2$ of 50 of 34 and a 10 min gel, lbf/100 ft$^2$ of 112 with a composition including the sepiolite and no diutan. The results demonstrate that a thixotropic slurry cement can be designed from a sorel cement and the combination of diutan and sepiolite to generate a thixotropic cement slurry with a high gel and compressive strength.

As used below, any reference to a series of examples is to be understood as a reference to each of those examples disjunctively (e.g., "Examples 1-4" is to be understood as "Examples 1, 2, 3, or 4"). In some aspects, methods, and mixtures for thixotropic slurry material with enhanced reliability for use in a wellbore is provided according to one or more of the following examples:

Example 1 is a method comprising: providing a base material, wherein the base material comprises a clay mineral, a suspending agent, and a cement; generating, from the base material, a base thixotropic slurry material; contacting a permeable zone in a wellbore with the base thixotropic slurry material; and performing a wellbore operation within the wellbore.

Example 2 is the method of example(s) 1, wherein generating the base thixotropic slurry further includes: adjusting the base thixotropic slurry material, wherein adjusting the base thixotropic slurry material comprises adding at least one of an epoxy resin composition, an amorphous silica, a set retarder, a foaming agent, water, a defoaming agent, glass beads, barite, calcium carbonate, or manganese tetroxide, to the base thixotropic slurry material.

Example 3 is the method of example(s) 1, wherein the permeable zone is a lost circulation zone, and wherein the wellbore operation is a drilling operation, a cementing operation, or a combination thereof.

Example 4 is the method of example(s) 1, wherein the suspending agent is present in an amount from 0.1 weight percent to 4 weight percent by weight of the base thixotropic slurry.

Example 5 is the method of example(s) 1, wherein the clay mineral is present in an amount from 1 weight percent to 30 weight percent by weight of the base thixotropic slurry.

Example 6 is the method of example(s) 1, wherein the cement comprises a non-hydraulic cement comprising magnesium chloride, magnesium oxide, and sodium hexametaphosphate.

Example 7 is the method of example(s) 1, wherein the epoxy resin composition comprises: an epoxy resin; an epoxy resin hardener; and an accelerator, wherein the epoxy resin is present in an amount of 5 weight percent to 50 weight percent by weight of the base thixotropic slurry material, the epoxy resin hardener is present in an amount of 1 weight percent to 50 weight percent by weight of the base thixotropic slurry material, and the accelerator is present in an amount of 0.5 weight percent to 50 weight percent by weight of the base thixotropic slurry material.

Example 8 is the method of example(s) 2, wherein the amorphous silica is present in an amount of 5 weight percent to 150 weight percent by weight of the base thixotropic slurry.

Example 9 is the method of example(s) 2 wherein the base thixotropic slurry material has a density of 9 ppg to 16 ppg, has a 10-minute static gel strength of at least 50 lbf/100 ft$^2$ at 80° F., and has a compressive strength of at least 50 psi at 100° F.

Example 10 is the method of example(s) 7, wherein the epoxy resin comprises a first epoxy resin comprising a butyl glycidyl ether and a second epoxy resin comprising a cyclohexanedimethanol diglycidyl ether.

Example 11 is a base slurry material comprising: a cement; a clay mineral; and a suspending agent.

Example 12 is the base slurry material of example(s) 11, further comprising as least one of an epoxy resin composition, water, an amorphous silica, a set retarder, a foaming agent, a defoaming agent, glass beads, barite, calcium carbonate, manganese tetroxide, or any combination thereof.

Example 13 is the base slurry material of example(s) 12 wherein the slurry material is usable as a lost circulation material during a drilling operation, a cementing operation, or a combination thereof.

Example 14 is the base slurry material of example(s) 11 wherein the clay is present in an amount from 1 weight percent to 30 weight percent by weight of the base slurry material.

Example 15 is the base slurry material of example(s) 11 wherein the suspending agent is present in an amount from 0.1 weight percent to 4 weight percent by weight of the base slurry material.

Example 16 is the base slurry material of example(s) 11 wherein the cement comprises a non-hydraulic cement comprising magnesium chloride, magnesium oxide, and sodium hexametaphosphate.

Example 17 is the base slurry material of example(s) 12 wherein the epoxy resin composition comprises: an epoxy resin; an epoxy resin hardener; and an accelerator, wherein the epoxy resin is present in an amount of 5 weight percent to 50 weight percent by weight of the base slurry material, the epoxy resin hardener is present in an amount of 1 weight percent to 50 weight percent by weight of the base slurry material, and the accelerator is present in an amount of 0.5 weight percent to 50 weight percent by weight of the base slurry material.

Example 18 is the base slurry material of example(s) 12, wherein the amorphous silica is present in an amount of 5 weight percent to 150 weight percent by weight of the base slurry material.

Example 19 is the base slurry material of example(s) 12, wherein the base slurry material has a density of 9 ppg to 16 ppg, has a 10-minute static gel strength of at least 50 lbf/100 ft$^2$ at 80° F., and has a compressive strength of at least 50 psi at 100° F.

Example 20 is the base slurry material of example(s) 17, wherein the epoxy resin comprises a first epoxy resin comprising a butyl glycidyl ether and a second epoxy resin comprising a cyclohexanedimethanol diglycidyl ether.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A thixotropic slurry material comprising:
a hydraulic cement;
a blend of a clay mineral, a suspending agent, and amorphous silica;
water; and
wherein the clay mineral is present in an amount of 14.9 weight percent to 20 weight percent of the blend, the suspending agent is present in an amount of 2 weight percent to 2.1 weight percent of the blend, the amorphous silica is present in an amount of 78 weight percent to 83 weight percent of the blend, and the thixotropic slurry material has a 10 second gel strength of between 8 lbf/100 ft$^2$ to 20 lbf/100 ft$^2$ and a rheology including a yield point of between 3 lbf/100 ft$^2$ to 9 lbf/100 ft$^2$ at each of 3 RPM and 6 RPM, at a temperature of 130° F.

2. The thixotropic slurry material of claim 1, wherein the clay mineral is sepiolite, the suspending agent is diutan gum, and the amorphous silica is silica fume.

3. The thixotropic slurry material of claim 2, wherein the hydraulic cement is Class G cement.

4. The thixotropic slurry material of claim 2, further comprising at least one of a set retarder, a foaming agent, a defoaming agent, glass beads, barite, calcium carbonate, manganese tetroxide, or any combination thereof.

5. The thixotropic slurry material of claim 2, wherein a weight percent ratio of the water to the hydraulic cement and the blend, collectively, is 3:4.

6. The thixotropic slurry material of claim 5, wherein a weight percent ratio of the hydraulic cement to the blend is 2:1.

7. The thixotropic slurry material of claim 5, wherein the thixotropic slurry material has a density of 10 ppg.

8. The thixotropic slurry material of claim 5, wherein the thixotropic slurry material has a 10-minute static gel strength of between 83 lbf/100 ft$^2$ to 128 lbf/100 ft$^2$ at 80° F.

9. The thixotropic slurry material of claim 5, wherein the thixotropic slurry material reaches a compressive strength of 100 psi at 150° F. is reached in a time of between 7 hours and 9 hours.

10. The thixotropic slurry material of claim 1, wherein the thixotropic slurry material is usable as a lost circulation material during a drilling operation, a cementing operation, or a combination thereof.

11. A method comprising:
providing a base material comprising a hydraulic cement and a blend of a clay mineral, a suspending agent, and amorphous silica, wherein the clay mineral is present in an amount of 14.9 weight percent to 20 weight percent of the blend, the suspending agent is present in an amount of 2 weight percent to 2.1 weight percent of the blend, and the amorphous silica is present in an amount of 78 weight percent to 83 weight percent of the blend;
adding water to the base material to generate a thixotropic slurry material having a 10 second gel strength of between 8 lbf/100 ft$^2$ to 20 lbf/100 ft$^2$ and a rheology including a yield point of between 3 lbf/100 ft$^2$ to 9 lbf/100 ft$^2$ at each of 3 RPM and 6 RPM, at a temperature of 130° F.;
contacting a permeable zone in a wellbore with the thixotropic slurry material; and
performing a wellbore operation within the wellbore.

12. The method of claim 11, wherein generating the thixotropic slurry material further includes: adjusting the base material, and wherein adjusting the base material comprises adding at least one of an amorphous silica, a set retarder, a foaming agent, water, a defoaming agent, glass beads, barite, calcium carbonate, or manganese tetroxide to the base material.

13. The method of claim 11, wherein the thixotropic slurry material has a density of 10 ppg.

14. The method of claim 11, wherein the clay mineral is sepiolite, the suspending agent is diutan gum, and the amorphous silica is silica fume.

15. The method of claim 14, wherein the hydraulic cement is Class G cement.

16. The method of claim 14, wherein a weight percent ratio of the water to the hydraulic cement and the blend, collectively, is 3:4.

17. The method of claim 16, wherein a weight percent ratio of the hydraulic cement to the blend is 2:1.

18. The method of claim 14, wherein the thixotropic slurry material has a 10-minute static gel strength of between 83 lbf/100 ft$^2$ to 128 lbf/100 ft$^2$ at 80° F.

19. The method of claim 14, wherein the thixotropic slurry material reaches a compressive strength of 100 psi at 150° F. in a time of between 7 hours and 9 hours.

20. The method of claim 11, wherein the wellbore operation is a drilling operation, a cementing operation, or a combination thereof.

\* \* \* \* \*